Figure 1:
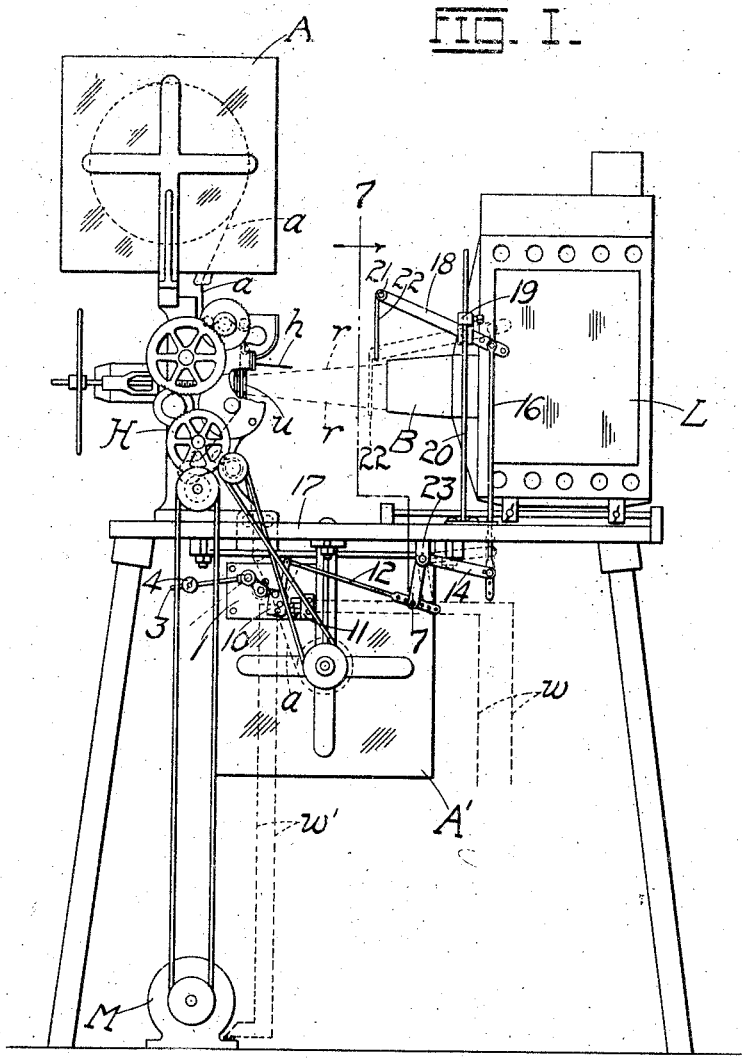

J. C. CHAMBERS.
MOTION PICTURE PROJECTING MACHINE.
APPLICATION FILED MAR. 18, 1918.

1,278,591.

Patented Sept. 10, 1918.
2 SHEETS—SHEET 1.

WITNESSES:
Harry A. Binney
Joo a michey

INVENTOR.
James C. Chambers,
By Emil Stareck
ATTORNEY.

J. C. CHAMBERS.
MOTION PICTURE PROJECTING MACHINE.
APPLICATION FILED MAR. 18, 1918.
1,278,591.
Patented Sept. 10, 1918.
2 SHEETS—SHEET 2.
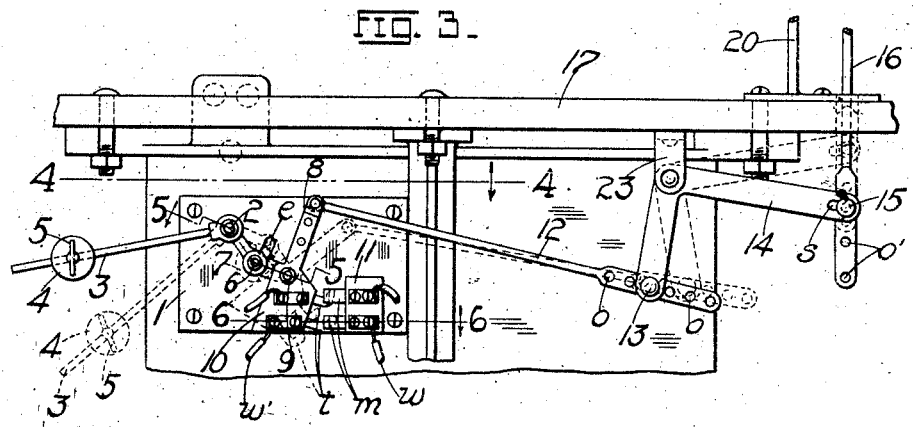
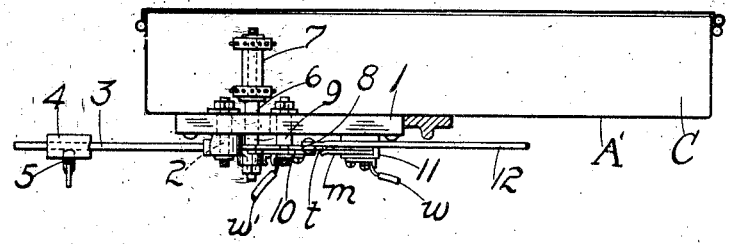
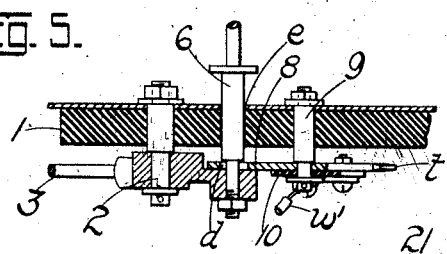
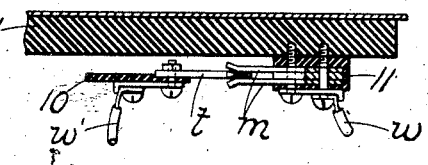
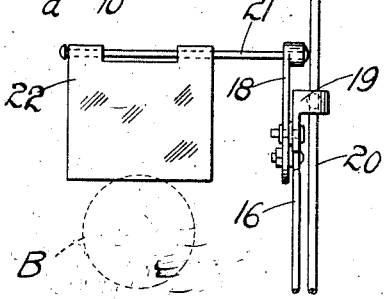
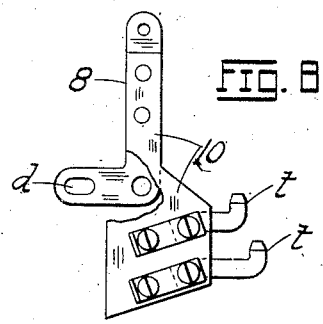
WITNESSES:
Harry O. Benney
Joamichel
INVENTOR.
James C. Chambers.
BY Emil Starek
ATTORNEY.

UNITED STATES PATENT OFFICE.

JAMES C. CHAMBERS, OF ST. LOUIS, MISSOURI.

MOTION-PICTURE-PROJECTING MACHINE.

1,278,591.  Specification of Letters Patent.  Patented Sept. 10, 1918.

Application filed March 18, 1918. Serial No. 223,106.

*To all whom it may concern:*

Be it known that I, JAMES C. CHAMBERS, a citizen of the United States, residing at St. Louis, State of Missouri, have invented certain new and useful Improvements in Motion - Picture - Projecting Machines, of which the following is a full, clear, and exact description, reference being had to the accompanying drawings, forming a part hereof.

The present improvement is directed to motion picture projecting machines, these pictures as well understood in the art, being carried on films composed of highly inflammable material. To secure the necessary projection a powerful light must be employed, the heat generated by such light being sufficient to ignite the film should the movement of the latter be arrested for any appreciable length of time during the normal operation of the machine. Under the present state of the art suitable provision is made to automatically interpose a shutter or shield in the path of the light rays the moment the feed of the film is stopped as a result of the stopping of the machine or motion head by which the film is advanced. So far as I am aware however, no provision exists for cutting off the light rays in the event that the film breaks or becomes in any way disarranged or tangled while the motion head is in operation as frequently is the case in practice; and unless the operator is alert and is constantly watching the machine, the film, unless the light rays are at once cut off or intercepted under the conditions specified, takes fire and is thereby ruined or damaged. It is therefor the object of my invention to bring automatically into action a light shield or cut-off which shall instantly drop or move into a position in the path of the light rays and thus cut off the light and heat from the film until the latter may be readjusted by the operator. As well understood in the art, the film winds on one reel and unwinds from another and is under tension while in service or in motion; and in the present embodiment of my invention I utilize this tension for controlling not only the action of the shield or cut-off aforesaid, but also the action of the contacts or wipers which close the circuit that conducts the current operating the motor by which the film is propelled. When anything therefore happens to the film which tends to remove the tension under which the same operates under normal service conditions, the shield or cut-off instantly asserts itself and the light rays are intercepted so that the film can not take fire. The advantages of the invention will be fully apparent from the following detailed description in connection with the accompanying drawings in which—

Figure 2:
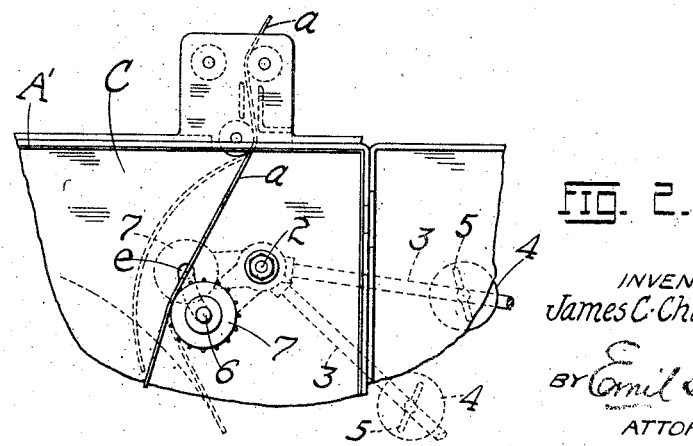

Figure 1 represents a side elevation of a conventional motion picture projecting machine showing my invention applied thereto; Fig. 2 is a detail showing an inner end view of the roller or idler carried by the weighted tripping lever, and an edge view of the film engaging said roller; Fig. 3 is an enlarged side elevation of the bottom set of connections entering into the construction of the light-shield controlling mechanism; Fig. 4 is a horizontal sectional detail on the line 4—4 of Fig. 3, parts being in top plan; Fig. 5 is an enlarged transverse sectional detail on the inclined zig-zag line 5—5 of Fig. 3; Fig. 6 is an enlarged horizontal sectional detail on the line 6—6 of Fig. 3; Fig. 7 is an enlarged vertical cross-sectional detail of the shield-actuating mechanism only, on the zig-zag line 7—7 of Fig. 1; and Fig. 8 is a detached elevational detail of the wiper supporting member of the actuating mechanism.

Referring to the drawings, L, represents a projecting lantern, H, the motion-head of film-advancing mechanism operated by the electric motor M, the film $a$ unwinding from a reel or spindle in the magazine A, and winding on a reel or spindle in the magazine A', motion being imparted to the film and to the reels by mechanism well known in the art and shown more or less conventionally in the drawings. The film in its passage from the unwinding to the winding reel is maintained taut, sufficient tension being imposed thereon to preserve uniformity of speed and positiveness of travel and prevent clogging or congestion. The tension or tautness of the film is a condition availed of under my invention to bring about the proper control of the mechanism by which the light shield or cut-off is actuated with any change or relaxation of said tension. As well understood in the art the film passes in front of a window $u$ through which the light rays $r$ are transmitted in their passage through the film, said rays being automatically cut off or intercepted by a hinge plate $h$ when the mechanism of the motion head comes to a stop. My invention has for its object to cut off the light (and heat) rays while the motion head is in operation and under circumstances where the film may accidentally tear or its travel becomes arrested or is continued from the unwinding reel without wrapping on the winding reel, and in general in cases where the tension or tautness of the film is for any reason relaxed. In the present embodiment of my invention I provide the outer wall of the magazine A' with a plate or mounting 1 to which is secured a stud 2, the projecting end of which supports a bent tripping lever 3 suitably weighted by a weight 4 on the long arm of the lever, said weight being adjustable along said arm and secured thereto by a set screw 5 as shown. A spring could be substituted for the weight. Coupled to the short arm of the lever 3 and freely traversing a curved slot $e$ in the plate 1 and wall of the magazine to which the same is secured, is a spindle 6 the inner end whereof terminates in the magazine chamber C and has mounted thereon a spool or idler 7 over which the film $a$ passes. In the normal operation of the machine the tension or tautness imposed on the film maintains the lever 3 in substantially the position indicated (Figs. 1 and 3) that is, it keeps the long arm of the lever in a raised position, said arm being free to drop the moment the tension on the film is for any reason removed or relaxed. The outer reduced end of the spindle 6 which is secured to the short arm of the lever 3 freely traverses a slot $d$ of the short arm of a bent or bell crank lever 8 oscillating about a stud 9 mounted on the plate 1, said lever 8 having secured thereto an insulating plate or sheet 10 of a shape substantially as detailed in Fig. 8, said plate carrying the wipers or contacts $t$, $t$, which in the normal operation of the machine serve to engage the contacts $m$, $m$, to which lead the wires $w$, $w$, from any suitable source of electric energy, the wipers $t$, $t$, on the other hand having leading therefrom the wires $w'$, $w'$, which directly feed the current to the motor M. The contacts $m$, $m$, are mounted on an insulating block 11, the plate 1 being likewise of insulating material.

Pivotally secured to the long arm of the bell crank 8 is one end of a link 12 whose opposite flattened terminal is provided with a series of holes $o$ through any one of which may be pivotally coupled to the link by means of a pin 13 the adjacent arm of a second bell crank lever 14, the free end of the opposite arm being provided with a slot $s$ through which, by means of a pin 15 said arm may be loosely coupled to the lower flattened end of a vertically reciprocating rod or bar 16, said flattened end being formed with a series of holes $o'$ through any of which the coupling may be effected. The rod 16 passes loosely through the platform 17 of the machine, the upper portion of the rod being pivotally coupled to the short arm of a vertically oscillating lever 18 which is in turn pivotally secured to the vertical leg of a block 19 adapted to be set-screwed at any desired point along the post or staff 20 leading from the platform 17. Projecting horizontally from the long arm of the lever 18 is a rod 21 from which is freely suspended or hung the drop shield 22, said shield or cut-off being positioned to come in the path of the rays $r$, $r$, when dropped to its lowest position and thus intercept said rays before they can do harm to the film $a$ under circumstances such as above related.

The operation of the device is apparent from the drawings, but may be briefly stated to be as follows: When the machine is in service and the film maintained taut or under tension in its passage from the reel of one magazine to that of the other, the spool or idler 7 bearing against the film holds the long arm of the lever 3 in a raised position, the intermediate connections between said lever and drop shield 22 holding the latter raised above the path of the rays $r$, $r$, issuing from the hood B of the projecting lantern L, allowing said rays to pass freely through the window $u$ and through the film. In the event however, that anything happens to the film so as to release the tension imposed thereon (for example a break in the film), the film being no longer under tension will release the spool 7 allowing the weighted lever arm of the lever 3 to drop, said lever oscillating to the dotted position shown in Fig. 3, whereupon through the several link connections as described the rod 16 will be pushed upward, causing the lever 18 to oscillate in a direction to depress the long arm thereof and thereby automatically drop the shield 22 across the path of the rays $r$, $r$, so that in the event the operator is not on hand to stop the motion head, the shield will cut off the light and heat rays and thereby save the film from destruction or taking fire. At the same time that the shield is dropped into position across the rays $r$, $r$, the lever 8 with its insulating plate or wiper supporting member 10 will be oscillated sufficiently to withdraw the wipers $t$, $t$, from their contacts $m$, $m$, so that the motor M and motion head come automaticaly to a stop, the electric circuit having been broken. As soon as the film has been restored or the accident remedied the parts are reset. I may of course depart in a measure from the details shown without in anywise affecting the nature or spirit of the invention. The bell-crank lever 14 is shown pivoted to a bracket 23 depending from the platform 17, but obviously it may be supported in any other suitable manner. Features shown but not alluded to are well known in the art and require no description in the present connection.

Having described my invention what I claim is:

In a motion picture projecting machine, a traveling film maintained under tension, a light source, means for conducting the rays to the film, a fixed support, a weighted vertically oscillating lever having an idler on one arm thereof bearing against the film, a spindle for said idler, the fixed support being provided with a slot for the free traverse of the spindle, a bell crank having one arm pivotally coupled to the adjacent arm of the lever, a wiper supporting member carried by said bell-crank, contacts on the fixed support coöperating with the wipers, a motor in electric connection with the wipers, a source of electric energy for the contacts, a link having one end pivotally secured to the opposite arm of the bell-crank, a second vertically oscillating bell-crank on the fixed support having an arm pivotally coupled to the opposite end of the link, a vertically reciprocating rod mounted on the fixed support and loosely coupled at its lower end to the adjacent arm of the second bell crank, a staff, a vertically oscillating lever carried by the staff and having an arm pivotally and loosely coupled to the upper end of the reciprocating rod, and a shield suspended from the opposite arm of the lever and adapted to drop across the path of the light rays upon a release of the first mentioned lever by the film due to a removal or reduction in the normal tension imposed on the film, whereby the circuit is broken and at the same time the shield drops into position to intercept the rays going to the film.

In testimony whereof I affix my signature, in presence of two witnesses.

JAMES C. CHAMBERS.

Witnesses:
EMIL STAREK,
JOS. A. MICHEL.